United States Patent [19]

Seki et al.

[11] Patent Number: 5,061,665
[45] Date of Patent: * Oct. 29, 1991

[54] PROCESS FOR PRODUCING AN IMPROVED ALUMINA-ZIRCONIA COMPOSITE SINTERED MATERIAL

[75] Inventors: Ichiro Seki, Tsukiyono; Akihiro Kano, Akagi; Toshiki Hasegawa, Yokohama; Minoru Abe, Maebashi; Isao Isa, Misato, all of Japan

[73] Assignee: The Japan Carlit Co., Ltd., Tokyo, Japan

[*] Notice: The portion of the term of this patent subsequent to May 9, 2006 has been disclaimed.

[21] Appl. No.: 462,095

[22] Filed: Jan. 8, 1990

[30] Foreign Application Priority Data

| Jan. 13, 1989 | [JP] | Japan | 1-4860 |
| Jan. 13, 1989 | [JP] | Japan | 1-4861 |
| Nov. 22, 1989 | [JP] | Japan | 1-302064 |
| Nov. 22, 1989 | [JP] | Japan | 1-302065 |

[51] Int. Cl.$^5$ .................. C04B 35/10; C04B 35/48
[52] U.S. Cl. .................. 501/105; 501/127; 501/153; 423/608; 423/625
[58] Field of Search ............... 501/105, 107, 127, 153; 35/48, 49, 10; 423/608, 625

[56] References Cited

U.S. PATENT DOCUMENTS

| 3,881,282 | 5/1975 | Watson . | |
| 3,916,585 | 11/1975 | Barks | 501/105 |
| 4,211,624 | 7/1980 | Semkina et al. | 501/105 |
| 4,646,950 | 3/1987 | Gotoh et al. | 501/105 |
| 4,760,038 | 7/1988 | Kinney, Jr. et al. | 501/105 |
| 4,829,028 | 5/1989 | Seki et al. | 501/105 |

FOREIGN PATENT DOCUMENTS

| 55-121967 | 9/1980 | Japan . |
| 59-227726 | 12/1984 | Japan . |
| 62-100412 | 5/1987 | Japan . |
| 62-119158 | 5/1987 | Japan . |
| 62-223061 | 10/1987 | Japan . |
| 62-265169 | 11/1987 | Japan . |
| 62-288157 | 12/1987 | Japan . |
| 316257 | 7/1988 | Japan . |
| 63-201060 | 8/1988 | Japan . |
| 64-51369 | 2/1989 | Japan . |

*Primary Examiner*—William R. Dixon, Jr.
*Assistant Examiner*—Paul Marcantoni
*Attorney, Agent, or Firm*—Frishauf, Holtz, Goodman & Woodward

[57] ABSTRACT

Improved alumina-zirconia composite sintered materials with sufficient high mechanical strength and thermal shock resistance as well as excellent hardwearing resistance are made by mixing, heating and melting zirconia and alumina, then the produced melt was quenched, and the resulting solid was ground and milled while adding thereto at least one compound of ceria and/or titania, to an average grain size of from about 0.5 to about 1.5 μm, and subjected the resulting powder to molding and sintering at a temperature of from 1450° to about 1600° C., said zirconia, ceria and titania being employed in the amount of about 10–20%, about 3–7%, and about 15–25% by weight, respectively, plus the balance of alumina. Said sintered materials are useful for employment in structural materials, refractorial materials, erosion resistance materials, cutting tool materials, grinding and polishing materials, etc.

7 Claims, No Drawings

PROCESS FOR PRODUCING AN IMPROVED ALUMINA-ZIRCONIA COMPOSITE SINTERED MATERIAL

BACKGROUND OF THE INVENTION

1. Field of the Invention

This invention relates to a process for producing an improved alumina-zirconia composite sintered material which is useful for employment in structural materials, refractorial materials, erosion resistance materials, cutting tool materials, grinding and polishing materials, etc.

2. Description of the Prior Art

In the prior invention, a process for producing an alumina-zirconia composite sintered material was invented [Japanese Patent Public Disclosure (Laid-Open Publication) Nos. 100412/1987 and 51369/1989]. These sintered materials (so called ceramics) made by this method are twice as strong as alumina ceramics in bending and toughness strength.

Practical applications of this material are suitable for use in tough conditions of rapid temperature change and/or excess corrosion, both deterimental to metals. But in these environments, if a rapid volume change occurs at a point of phase-transformation from low temperature phase to high temperature phase or the reverse, the material becomes weakened if it contains a non-stabilized zirconia and so it weakened the material. As the volume change occurs, the grain boundaries in a sintered material crack, which can cause the occurrence of wear at rubbing and at impacting.

SUMMARY OF THE INVENTION

It is therefore an object of the present invention to provide an improved alumina-zirconia composite sintered material with excellent hardwearing properties and to provide a process for producing the same.

Another object of the present invention is to provide an improved alumina-zirconia composite sintered material with high mechanical strength and resistance to thermal shock and to provide a process for producing the same.

Another object of the present invention is to provide an improved alumina-zirconia composite sintered material with high mechanical strength and resistance to thermal shock as well as excellent hardwearing properties and to provide a process for producing the same.

Other objects and advantages of the present invention may become apparent to those skilled in the art from the following description.

DETAILED DESCRIPTION OF THE PREFERRED EMBODIMENTS

This invention relates to a process for producing an improved alumina-zirconia composite sintered material comprising mixing, heating and melting zirconia and alumina, then the produced melt being quenched, and the resulting solid ground and milled while adding thereto at least one compound selected from the group consisting of ceria and titania, at an average grain size of from about 0.5 to about 1.5 μm, and subjecting the resulting powder to molding and sintering at a temperature of from about 1450° to about 1600° C., said zirconia, ceria and titania being employed in the amounts of from about 10 to 20%, from about 3 to about 7%, and from about 10 to about 25% by weight, respectively, plus the balance of alumina.

The powder, involves about 10–20% by weight of zirconia, about 3–7% by weight of ceria and the rest of alumina was molded and sintered to become an improved alumina-zirconia composite sintered material with excellent hardwearing properties.

The powder involves about 10–20% by weight of zirconia, about 15–25% by weight of titania, and the rest of alumina was molded and sintered to become an improved alumina-zirconia composite sintered material with high mechanical strength and resistance to thermal shock.

The powder, involves about 10–20% by weight of zirconia, about 3–7% by weight of ceria, about 15–25% by weight of titania, and the rest of alumina to become an improved alumina-zirconia composite sintered material with high mechanical strength and resistance to thermal shock as well as excellent hardwearing properties.

When the component of the sintering material is less than 10% by weight, no improvement in the strength can be expected. Conversely, if more than 20% by weight of zirconia is employed, the presence of a monoclinic zirconia (so called non-stabilized zirconia), can cause the lowering of wear resistance. And also the sintered material of the powder produced may cause a large volume change at the transform point from low temperature phase to high temperature phase or the reverse, so weakening the strength of a low density sintered material, and it is not necessary to use high temperature to sinter it which is uneconomical. If an addition of ceria is less than 3% by weight, there is little wear resistance improvement, but if it is more than 7% by weight, the sintered material becomes lower in hardness and becomes less resistant in the case of abrasion with high hardness material. If an addition of titania is less than 10% by weight, the sintered material fails to have sufficient resistance to thermal shock because of large thermal expansion. Conversely, if an addition of titania is more than 25% by weight, we can expect resistance to thermal shock but a reduction in the mechanical strength.

The present process uses as raw materials of zirconia, ceria, titania and alumina, baddeleyite, cerium oxide, an industrial grade of titanium oxide and Bayer alumina, respectively. The impurities in these raw materials are not critical.

As the way of producing, the first step is weighing the raw materials of zirconia and alumina, then mixing, heating and melting by a gas furnace, a high-frequency induction heating furnace or an arc furnace. Then the melt is quenched. Various quenching methods can be used such as a method wherein a melt is passed between a plurality of rollers or is placed between metal plates each having a thickness sufficient to cool it and not easily react with it. The alumina-zirconia quenched material thus obtained is broken, crushed and ground. At the grinding step, one of a ceria compound and/or a titania compound is added to a prescribed amount according to the grain diameter. Especially, at the fine milling process, using a spherical or cylindrical solid as a media, for example a Ball mill, a Vibration mill or an Atrittion mill constructed of the same material, alumina and zirconica, suitable to ensure purity of the material. It is desirable that the solid should be ground to an average grain diameter of 1.5 μm or smaller. On the other hand, if the average grain diameter is larger than 1.5 μm, it becomes uneconomical to produce the optimum sintered material, because the sintering temperature should be higher. The smaller the average grain diameter the lower the sintering temperature is to obtain the optimum sintered material, but the grinding is costly. The average grain diameter should be limited at 0.5 μm. The measuring method of an average grain diameter can be done by the X-ray diffraction method, the Laser diffraction method, the electric resistance method or the method of measuring a sedimentation grain diameter by photo-transmittance.

In this way, the powder produced, is molded into a fixed shape by a monoaxial press or a hydrostatic pressure press. The molded body (so-called a green body) is heated and sintered by an electric furnace or a gas furnace in the atmosphere and under normal pressure, then sintered materials are produced which are suitable for use in various applications. Feasible applications include those requiring high strength and toughness and high resistance to thermal shock (e.g., structural material, refractory, cutting tool materials, grinding and polishing materials, etc.). When sintered the sintering temperature is lower than 1450° C., the material is weakened because of inadequate sintering. When the sintering temperature is higher than 1600° C., the wear resistance or the thermal shock resistance of the sintered material is reduced because of the growth of constituent grains. Therefore, sintering at 1450°–1600° C. is desirable to produce a high density sintered material.

The effects of the present invention will be shown below by way of Examples and Comparative Examples which are given here for illustrative purposes only and are by no means intended to limit the scope of the invention.

EXAMPLES 1-5

Baddeleyite as a zirconia material, Bayer alumina as an alumina material and cerium oxide as a cerium material were weighed out in ratios as shown in Table 1. First, the alumina material and zirconia material were mixed, then the mixtures were heated and melted at about 1800° to 2500° C. in an arc furnace to obtain uniform melts. Each melt was poured between iron plates which were equipped with a water jacket, and then quenched. The resulting solids were ground, and then a prescribed amountof a ceria was added. Fine grinding was conducted in an attrition mill with balls as the medium made of alumina-zirconia materials in a wet method. The resulting slurries were measured for grain size distribution by the electric resistance method using the "Coulter Counter", a binder was added to make a spherical cohesive body which was spray-dried using a spray drier to produce dried spherical powder.

These powders were put into a die and molded into a square pillar shape at a pressure of 300 kg/cm² using a monoaxial press. This molding was placed in a rubber bag and subjected to a cold isostatic press of 1,000 kg/cm². Then, the molding was placed in an electric furnace and sintered for 2 hours at atmospheric pressure in an air atmosphere with sintering temperatures shown at Table 1. Each sintered material produced was measured for density by the Archimedes method. The amount of wear resistance was measured by following the method to measure the wear. The produced sintered body was cut out in the following size, length: 40 mm; width: 4 mm; thickness: 3 mm, then the surface of the cut out body was polished with a polishing pad which had adhered to it #220 particle size of diamonds. After weighing, it was polished with a polishing pad which had adhered to it #400 particle size of diamonds for 10 minutes, and it was weighed again, then the removal weight of the sintered body was weighted. After the polishing it was loaded on a weight of 1 kg. The 3-point bending strength was measured by the method specified by JIS R1601.

The results are shown in Table 1.

COMPARATIVE EXAMPLES 1-4

As compared with this invention, the sintered body was made by the same method without the composition of this invention. The measuring method is the same as Examples 1-5. The results are shown in Table 1. In addition, the sample of experiment No. 9 is used a commercially available, easily sinterable low-soda-containing alumina, and molded by the same method of Example 1.

TABLE 1

| | Raw material (wt %) | | | Mean diameter (μm) | Sintering temperature (°C.)* | Bulk density | Wear | | 3-point bending strength (MN/m²) |
|---|---|---|---|---|---|---|---|---|---|
| | Baddeleyite | Ceria | Bayer alumina | | | | Weight (mg) | Ratio | |
| Ex. 1 | 10 | 3 | 87 | 1.48 | 1600 | 4.02 | 75 | 0.89 | 720 |
| Ex. 2 | 15 | 5 | 80 | 0.95 | 1525 | 4.17 | 48 | 0.57 | 900 |
| Ex. 3 | 20 | 7 | 73 | 0.52 | 1450 | 4.24 | 45 | 0.54 | 850 |
| Ex. 4 | 10 | 7 | 83 | 1.15 | 1550 | 4.06 | 62 | 0.74 | 780 |
| Ex. 5 | 20 | 3 | 77 | 0.85 | 1575 | 4.20 | 57 | 0.68 | 750 |
| Comp. Ex. 1 | 15 | — | 85 | 0.95 | 1550 | 4.08 | 84 | 1.00 | 760 |
| 2 | 5 | 2 | 93 | 0.95 | 1550 | 4.02 | 88 | 1.05 | 630 |
| 3 | 25 | 8 | 67 | 0.92 | 1600 | 4.15 | 105 | 1.25 | 560 |
| 4 | — | — | 100 | 0.82 | 1600 | 3.94 | 330 | 3.93 | 350 |

*For 2 hours kept at indicated temperature, then cooled in a furnace.

EXAMPLES 6-10

Baddeleyite as zirconia material, Bayer alumina as an alumina material and industrial grade titanium oxide as a titania material were used. Those were weighed out in the ratios as shown in Table 2. The following process was the same as Examples 1-5 to make the sintered material for test.

The thermal shock test was carried out by the following procedure. The test pieces were put on a plate made of an alumina refractory and heated to the indicated temperature shown in Table 2 for less than 15 minutes and dropped in a mixture of water and crushed ice. Provided just under the door of the electric muffle furnace. The rising temperature of the mixture of water and crushed ice was negligible at quenching and the difference of temperature at the quench was equal to maintain the temperature of the test pieces in the electric muffle furnace. Then the pieces were wiped on the surface, and dried. The 3-point bending strength was measured by the method specified by JIS R1601. The apparent thermal expansion values were measured by using the Rigakudenki's model TMA 8140 type apparatus of thermal mechanical analysis.

The results are shown in Table 2.

COMPARATIVE EXAMPLE 5

The raw materials used were an alumina and titania, the easy sinterable low-soda containing Bayer alumina powder and the Anatase formed titanium oxide powder of the first grade reagent, respectively. An alumina of 560 g and a titania of 440 g were weighed, and put into an alumina pot volume 5 l of a vibration mill. The alumina balls having a diameter of 5 mm and weighing 8 kg were put into the same pot with water. The grind was done by the wet method. The produced slurry was put on the shelf and dried in an electric drying oven. The dried powder was left at 1600° C. for 2 hours. The thus obtained clinker was measured by X-ray diffraction and the diffract pattern indicated an aluminium-titanate, then these clinkers were crushed by a roll crusher, and passed through a sieve having a screen opening of 44 μm. The powder weighing 800 g was ground by a vibration mill and the grinding condition was the same as above. After this step, the test process was carried out the same as Examples 6–10.

The result is shown in Table 2.

be usable for material having high performance as a structural material, a refractory, a cutting tool material, a grinding and polishing material, etc.

TABLE 3

| | Raw material (wt %) | | | | Mean diameter (μm) | Sintering temperature (°C.)* | Bulk density | 3-point bending strength (MN/m$^2$) difference in Temperature (°C.) | | | | Apparent thermal expansion value ($\times 10^{-6}$/°C.) |
|---|---|---|---|---|---|---|---|---|---|---|---|---|
| | Baddeleyite | Titania | Ceria | Bayer alumina | | | | 400 | 600 | 800 | 1000 | |
| Ex. 11 | 10 | 25 | 3 | 62 | 0.88 | 1525 | 3.72 | 154 | 161 | 68 | 3 | 3.5 |
| Ex. 12 | 15 | 20 | 5 | 60 | 0.97 | 1550 | 3.91 | 170 | 185 | 96 | 3 | 2.8 |
| Ex. 13 | 20 | 15 | 7 | 58 | 0.75 | 1500 | 4.13 | 225 | 107 | 5 | 2 | 3.8 |

*For 2 hours kept at indicated temperature, then cooled in a furnace.

TABLE 2

| | Raw material (wt %) | | | Mean diameter (μm) | Sintering temperature (°C.)* | Bulk density | 3-point bending strength (MN/m$^2$) difference in temperature (°C.) | | | | Apparent thermal expansion value ($\times 10^{-6}$/°C.) |
|---|---|---|---|---|---|---|---|---|---|---|---|
| | Baddeleyite | Titania | Bayer alumina | | | | 600 | 800 | 1000 | 1200 | |
| Ex. 6 | 10 | 15 | 75 | 1.01 | 1500 | 3.75 | 122 | 75 | 44 | 3 | 2.7 |
| Ex. 7 | 15 | 20 | 65 | 0.98 | 1500 | 3.87 | 141 | 157 | 95 | 3 | 2.0 |
| Ex. 8 | 20 | 25 | 55 | 0.85 | 1500 | 4.01 | 95 | 121 | 89 | 5 | 1.8 |
| Ex. 9 | 10 | 25 | 65 | 1.49 | 1600 | 3.63 | 63 | 77 | 38 | 3 | 1.7 |
| Ex. 10 | 20 | 15 | 65 | 0.53 | 1450 | 4.08 | 135 | 95 | 46 | 2 | 3.2 |
| Comp. Ex. 5 | — | 44 | 56 | 0.92 | 1550 | 2.83 | 10 | 12 | 21 | 3 | 0.2 |

*For 2 hours kept at indicated temperature, then cooled in a furnace.

EXAMPLES 11–13

Baddeleyite as a zirconia material, Bayer alumina as an alumina material, industrial grade of titanium oxide as a titania material and cerium oxide as a ceria material were weighed out in ratios as shown in Table 3. The following process was the same as Examples 6–10.

The result is shown in Table 3.

From results of the Examples an improved alumina-zirconia composite material of this invention is found to

What is claimed is:

1. A process for producing an alumina-zirconia composite sintered material comprising mixing, heating and melting zirconia and alumina to form a melt, then quenching said melt to form solids, grinding and milling said solids while admixing ceria therewith to powder having an average grain size of about 0.5 to about 1.5 μm, and molding and sintering said powder at a temperature of about 1450° to about 1600° C., said zirconia and ceria being employed in the amounts of about 10% to 20%, and about 3% to about 7% by weight, respectively, with the balance being alumina.

2. The process according to claim 1, wherein the zirconia, ceria and alumina are employed in amounts of 10 weight %, 3 weight % and 87 weight %, respectively.

3. The process according to claim 1, wherein the zirconia, ceria and alumina are employed in amounts of 15 weight %, 5 weight % and 80 weight %, respectively.

4. The process according to claim 1, wherein the zirconia, ceria and alumina are employed in amounts of 20 weight %, 7 weight % and 73 weight %, respectively.

5. The process according to claim 1, wherein the zirconia, ceria and alumina are employed in amounts of 10 weight %, 7 weight % and 83 weight %, respectively.

6. The process according to claim 1, wherein the zirconia, ceria and alumina are employed in amounts of 20 weight %, 3 weight % and 77 weight %, respectively.

7. The process according to claim 2, which further comprises also admixing titania while grinding and milling, said titania being in an amount of 15 to 25% by weight.

* * * * *